United States Patent
Oowatari (10) Patent No.: US 10,414,600 B2
(45) Date of Patent: Sep. 17, 2019

(54) SUPPLY CONTROL DEVICE AND SUPPLY CONTROL METHOD

(71) Applicant: FANUC CORPORATION, Yamanashi (JP)

(72) Inventor: Hiroshi Oowatari, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 8 days.

(21) Appl. No.: 15/949,396

(22) Filed: Apr. 10, 2018

(65) Prior Publication Data
US 2018/0334336 A1 Nov. 22, 2018

(30) Foreign Application Priority Data
May 19, 2017 (JP) .................. 2017-099546

(51) Int. Cl.
B65G 43/08 (2006.01)
B65G 47/14 (2006.01)
(Continued)

(52) U.S. Cl.
CPC ............ B65G 43/08 (2013.01); B25J 9/0093 (2013.01); B25J 9/1697 (2013.01);
(Continued)

(58) Field of Classification Search
CPC .................................. B65G 47/1457
See application file for complete search history.

(56) References Cited

U.S. PATENT DOCUMENTS 4,527,326 A * 7/1985 Kohno ................... B25J 19/023
198/392
4,795,957 A * 1/1989 MacNeal, Jr. ......... B25J 9/1676
200/334
(Continued)

FOREIGN PATENT DOCUMENTS

| JP | H08-323669 A | 12/1996 |
|---|---|---|
| JP | 2006-082186 A | 3/2006 |
| JP | 2013-082054 A | 5/2013 |

OTHER PUBLICATIONS

An Office Action mailed by the Japanese Patent Office dated Nov. 13, 2018, which corresponds to Japanese Patent Application No. 2017-099546 and is related to U.S. Appl. No. 15/949,396.
(Continued)

*Primary Examiner* — Thomas Randazzo
(74) *Attorney, Agent, or Firm* — Studebaker & Brackett PC (57) ABSTRACT

Articles are continuously supplied to a robot by control circulation speed. In a supply control device for controlling a circulation device that causes an article to circulate in a system that includes the circulation device, and a robot that retrieves the article during circulation with the circulation device, the supply control device includes: a detection unit that detects the article circulating with the circulation device, and a position of the article; a measurement unit that measures a number of the articles in a predetermined region on the circulation device, based on detection results of the detection unit; and a control unit that controls a speed of circulation of the circulation device according to the number of the articles in the predetermined region measured by the measurement unit.

7 Claims, 4 Drawing Sheets

(51) Int. Cl.
    *B25J 9/00*     (2006.01)
    *B25J 15/02*    (2006.01)
    *B25J 9/16*     (2006.01)
    *B65G 47/90*    (2006.01)
    *B25J 19/02*    (2006.01)
(52) U.S. Cl.
    CPC ......... *B25J 15/0253* (2013.01); *B25J 19/023* (2013.01); *B65G 47/1457* (2013.01); *B65G 47/905* (2013.01); *G05B 2219/37614* (2013.01); *G05B 2219/40235* (2013.01); *Y10S 901/09* (2013.01); *Y10S 901/31* (2013.01); *Y10S 901/47* (2013.01)

(56) References Cited

U.S. PATENT DOCUMENTS

| | | | | |
|---|---|---|---|---|
| 5,386,762 A * | 2/1995 | Gokey | ................... | A47J 27/14 414/225.01 |
| 5,853,078 A * | 12/1998 | Kneubuhler | ....... | B65G 47/1421 198/391 |
| 6,311,825 B1 * | 11/2001 | Schmitt | .............. | B65G 47/1457 198/392 |
| 8,843,232 B2 * | 9/2014 | Hartmann | .......... | G05B 19/4182 700/230 |
| 9,776,808 B1 * | 10/2017 | Ooba | ................... | B65G 47/268 |
| 10,246,257 B1 * | 4/2019 | Battles | ................... | B65G 21/18 |
| 2006/0057239 A1 * | 3/2006 | Hariki | ................ | B65G 47/1457 425/126.1 |
| 2011/0223837 A1 * | 9/2011 | Duescher | .............. | B24B 37/107 451/28 |
| 2018/0374144 A1 * | 12/2018 | Smilowitz | .............. | B25J 9/1687 |

OTHER PUBLICATIONS

An Office Action; "Notice of Reasons for Refusal," mailed by the Japanese Patent Office dated Mar. 12, 2019, which corresponds to Japanese Patent Application No. 2017-099546.

An Office Action; "Decision to Grant a Patent," mailed by the Japanese Patent Office dated May 21, 2019, which corresponds to Japanese Patent Application No. 2017-099546.

* cited by examiner

SUPPLY CONTROL DEVICE AND SUPPLY CONTROL METHOD

This application is based on and claims the benefit of priority from Japanese Patent Application No. 2017-099546, filed on 19 May 2017, the content of which is incorporated herein by reference.

BACKGROUND OF THE INVENTION

Field of the Invention

The present invention relates to a supply control device and a supply control method which perform control for supplying articles.

Related Art

Conventionally, a system exists that aligns articles by picking with a robot, and then supplies these articles to a subsequent process.

An example of such a system is disclosed in Patent Document 1. With the system disclosed in Patent Document 1, a plurality of trays accommodating the articles is circulated. In addition, it is determined whether or not being a state in which a robot is able to pick an article from the situation of the articles accommodated in the tray. Then, when determined as able to pick, the robot is made to pick the article accommodated in this tray. On the other hand, when determined as unable to pick, the articles accommodated in this tray are agitated. With the system disclosed in Patent Document 1, the articles for picking are supplied to the robot in this way.

Patent Document 1

Japanese Unexamined Patent Application, Publication No. 2013-82054

SUMMARY OF THE INVENTION

With the aforementioned system disclosed in Patent Document 1, when the robot starts picking of articles within one tray, the circulation of trays is temporarily stopped. Then, if the robot picks all of the articles within the tray, circulation is started again, on the condition of having confirmed that agitation of articles in other trays has completed, and the articles in other trays have become able to be picked. In this way, the system disclosed in Patent Document 1, it enters a state in which circulation of trays remains stopped even after picking has completed until the condition is satisfied, and during this time, the robot cannot perform picking. In other words, with the system disclosed in Patent Document 1, picking by the robot becomes intermittent, and it is not possible to have picking performed continuously. Herein, in order to have picking continuously performed by the robot, it is necessary to continue circulation at the appropriate speed without allowing circulation to stop. However, in this case, it is not easy to determine the appropriate circulation speed in advance.

Therefore, the present invention has an object of providing a supply control device and a supply control method capable of continuously supplying articles to a robot by way of controlling the circulation speed.

A supply control device (for example, the supply control device 100 described later) provided by first aspect of the present invention is a supply control device for controlling a circulation device (for example, the circulation device 30 described later) that causes an article (for example, the work 40 described later) to circulate in a system that includes the circulation device, and a robot (for example, the robot 10 described later) that retrieves the article during circulation with the circulation device, the supply control device including: a detection unit (for example, the detection unit 101 described later) that detects the article circulating with the circulation device, and a position of the article; a measurement unit (for example, the measurement unit 102 described later) that measures a number of the articles in a predetermined region on the circulation device, based on detection results of the detection unit; and a control unit (for example, the control unit 103 described later) that controls a speed of circulation of the circulation device according to the number of the articles in the predetermined region measured by the measurement unit.

According to a second aspect of the present invention, the supply control device as described in the first aspect may be configured so that the detection unit further detects the position of the article circulating on the circulation device, the measurement unit measure a number of the articles in a predetermined region based on the position of the article detected by the detection unit, and the control unit controls so that the speed of circulation becomes faster with a fewer number of articles in the predetermined region measured by the measurement unit.

According to a third aspect of the present invention, the supply control device as described in the first or second aspect may be configured so that the control unit: raises the speed of circulation in a case of the article not being present in the predetermined region; lowers the speed of circulation in a case of at least a predetermined number of the articles being present in the predetermined region; and maintains the speed of circulation in a case of less than the predetermined number of the articles being present in the predetermined region.

According to a fourth aspect of the present invention, the supply control device as described in any one of the first to third aspects may be configured so that the predetermined region is a region in which the robot retrieves the article.

According to a fifth aspect of the present invention, the supply control device as described in any one of the first to fourth aspects may be configured so that circulation of the circulation device is performed by causing the article to undergo circular motion, and the control unit controls a rotation speed of the circular motion as control of the speed of circulation.

According to a sixth aspect of the present invention, the supply control device as described in any one of the first to fifth aspects may be configured so that the control unit further performs control of an axis possessed by the robot, and performs control of the speed of circulation as control of an additional axis of the robot.

A supply control method provided by a seventh aspect of the present invention is a supply control method, for controlling a circulation device (for example, the work circulation device 30 described later) that causes an article (for example, the work 40 described later) to circulate in a system that includes the circulation device, and a robot (for example, the robot 10 described later) that retrieves the article during circulation on the circulation device, the supply control method including the steps of: detecting the article circulating on the circulation device and a position of the article; measuring a number of the articles in a predetermined region of the circulation device, based on detection results of the step of detecting; and controlling a speed of circulation of the circulation device according to the number of the articles in the predetermined region measured in the step of measuring.

According to the present invention, it becomes possible to continuously supply articles to a robot by way of controlling the circulation speed.

DETAILED DESCRIPTION OF THE INVENTION

Figure 1:
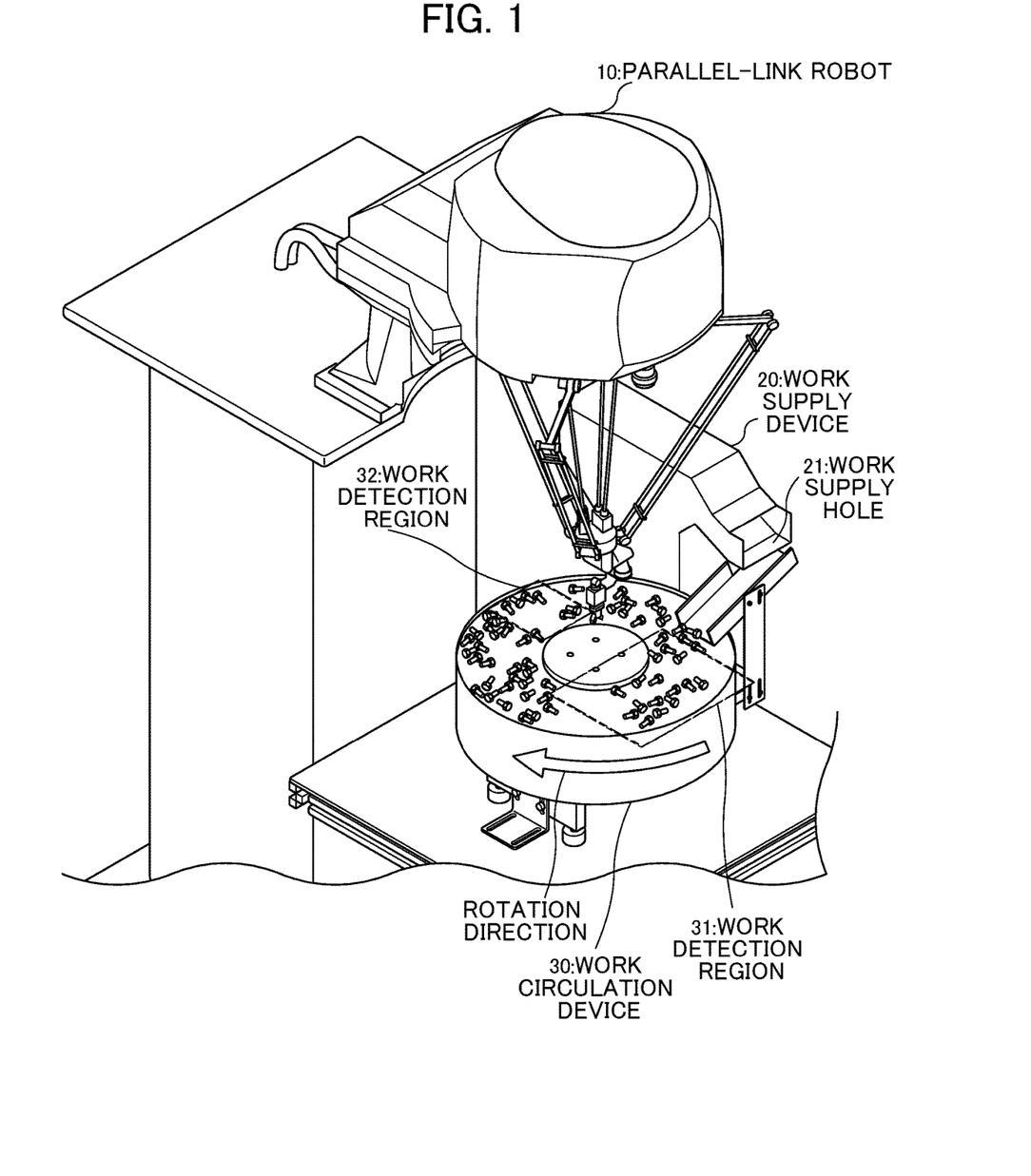
FIG. 1 is a views showing a basic overall configuration of an embodiment of the present invention.

Next, an embodiment of the present invention will be explained in detail by referencing the drawings. First, an explanation will be made by referencing FIG. 1 for an overall configuration of a picking system which is the present embodiment. As shown in FIG. 1, the present embodiment includes a parallel-link robot 10, a work supply device 20, a work circulation device 30 and works 40. It should be noted that the work 40 is a screw which circulates on the work circulation device 30; however, since the illustrated number thereof is large, illustration of the reference numbers are omitted for the works 40 in FIG. 1.

The parallel-link robot 10 is a robot which picks the work 40 circulating on the work circulation device 30. The parallel-link robot 10 arranges the picked works 40 in a predetermined orientation for a subsequent process and carries to a belt conveyor or the like.

The work supply device 20 is a device which supplies the works 40 to the work circulation device 30. The work supply device 20 transports the works 40 ejected from a hopper which stores the works 40 by way of an internal belt conveyor or the like, and ejects from a work supply hole 21. The works 40 are thereby supplied to the work circulation device 30.

The work circulation device 30 is a device which causes the works 40 supplied from the work supply device 20 to circulate according to a circular motion. A mobile portion of the work circulation device 30 is a columnar shape, and a wall of predetermined height is provided along the outer circumference on the top surface so that the circulating works 40 do not fall down. Then, by this mobile part rotating in the direction indicated as "rotational direction" in the drawings, the works 40 circulate. In addition, a work detection region 31 on the top surface of the work circulation device 30 is a region with 15 described later as an imaging target. Furthermore, a work retrieval region 32 is a region in which the parallel-link robot 10 retrieves the works 40.

In the present embodiment, by a supply control device 100 described later further controlling the rotation speed (hereinafter called "circulation speed" as appropriate) of the mobile part of the work circulation device 30, the works 40 are continuously supplied to the parallel-link robot 10. It should be noted that there are no particular limitations in the installation position of the supply control device 100, and since it is possible to install at any position, illustration thereof is omitted from FIG. 1. In addition, in regards to the aforementioned hopper, or the belt conveyor serving as the transport destination of the works 40, due to not being essentials of the present embodiment, illustration thereof is also omitted.

Figure 2:
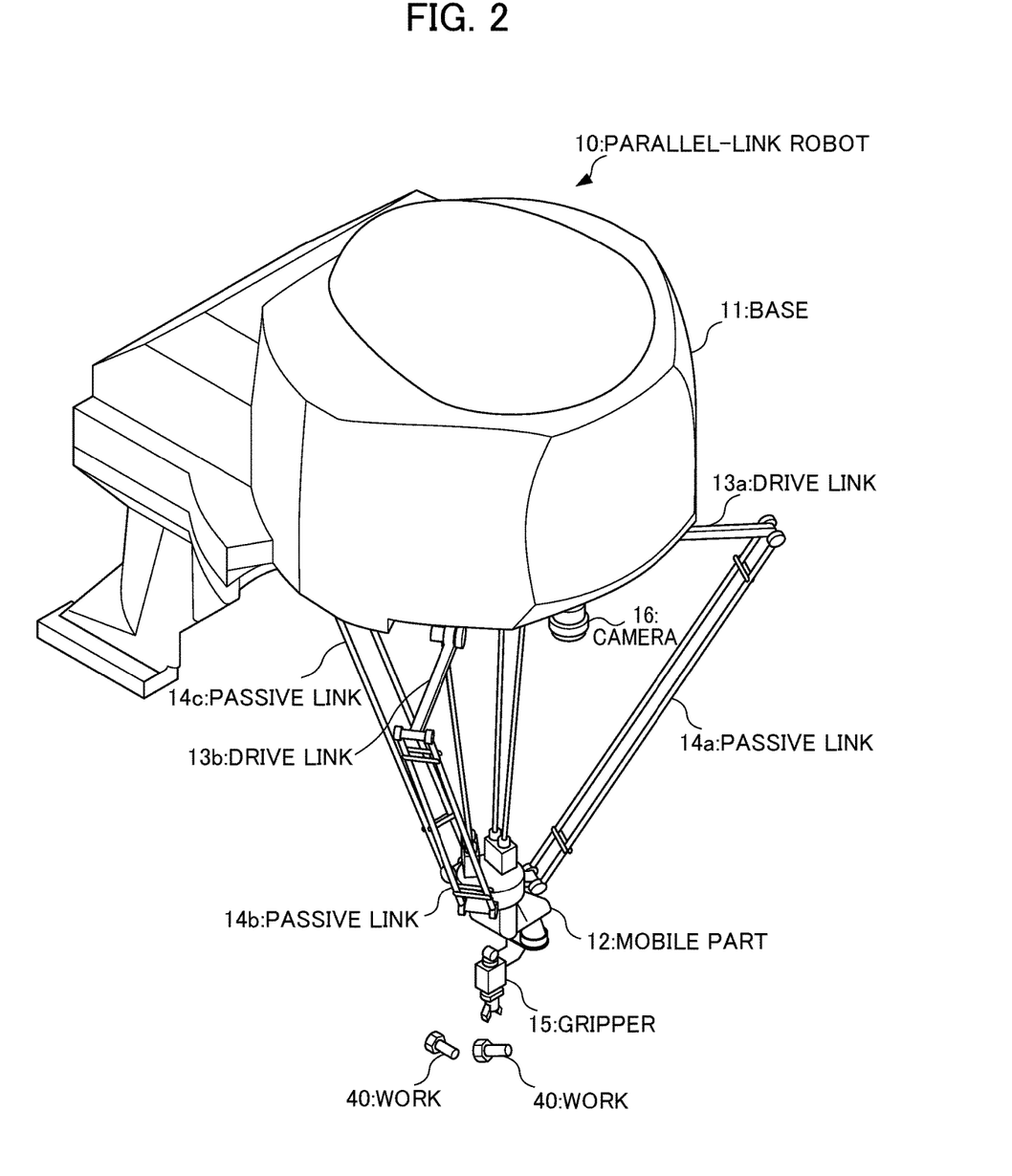
FIG. 2 is a view showing the basic configuration of a parallel-link robot of an embodiment of the present invention.

Next, an explanation will be made by referencing FIG. 2 for the detailed configuration of the parallel-link robot 10. The parallel-link robot 10 includes a base 11, a mobile part 12, a plurality of drive links 13, a plurality of passive links 14, a gripper 15 and a camera 16, as shown in FIG. 2. The parallel-link robot 10 is a robot having a delta-type parallel-link mechanism in order to position the mobile part 12 including the gripper 15 three-dimensionally.

The parallel-link robot 10 includes three pairs of drive link parts for connecting the mobile part 12 with the base 11. More specifically, each of the three pairs of drive link parts consists of a drive link 13 connected to a motor inside of the base 11, and a passive link 14 having two links which connect the drive link 13 and mobile 12 while extending in parallel to each other. Between the drive link 13 and passive link 14 is connected by two ball joints with three degrees of freedom (X,Y,Z). In addition, between the mobile part 12 and passive link 14 is connected by two ball joints with three degrees of freedom (X,Y,Z).

The parallel-link robot 10 causes the mobile part 12 to move in the three degrees of freedom (X,Y,Z), by individually controlling the movement of each pair of drive links 13 by way of the motor. In addition, the parallel-link robot 10 realizes picking of works 40, by controlling the opened/closed state of the gripper 15, which is an end effector. These controls are performs based on the control signal outputted from the supply control device 10 described later.

Furthermore, the parallel-link robot 10 photographs the aforementioned work detection region 31 by way of the camera 16. The imaging data obtained by photography is outputted to the supply control device 100 described later.

Figure 3:
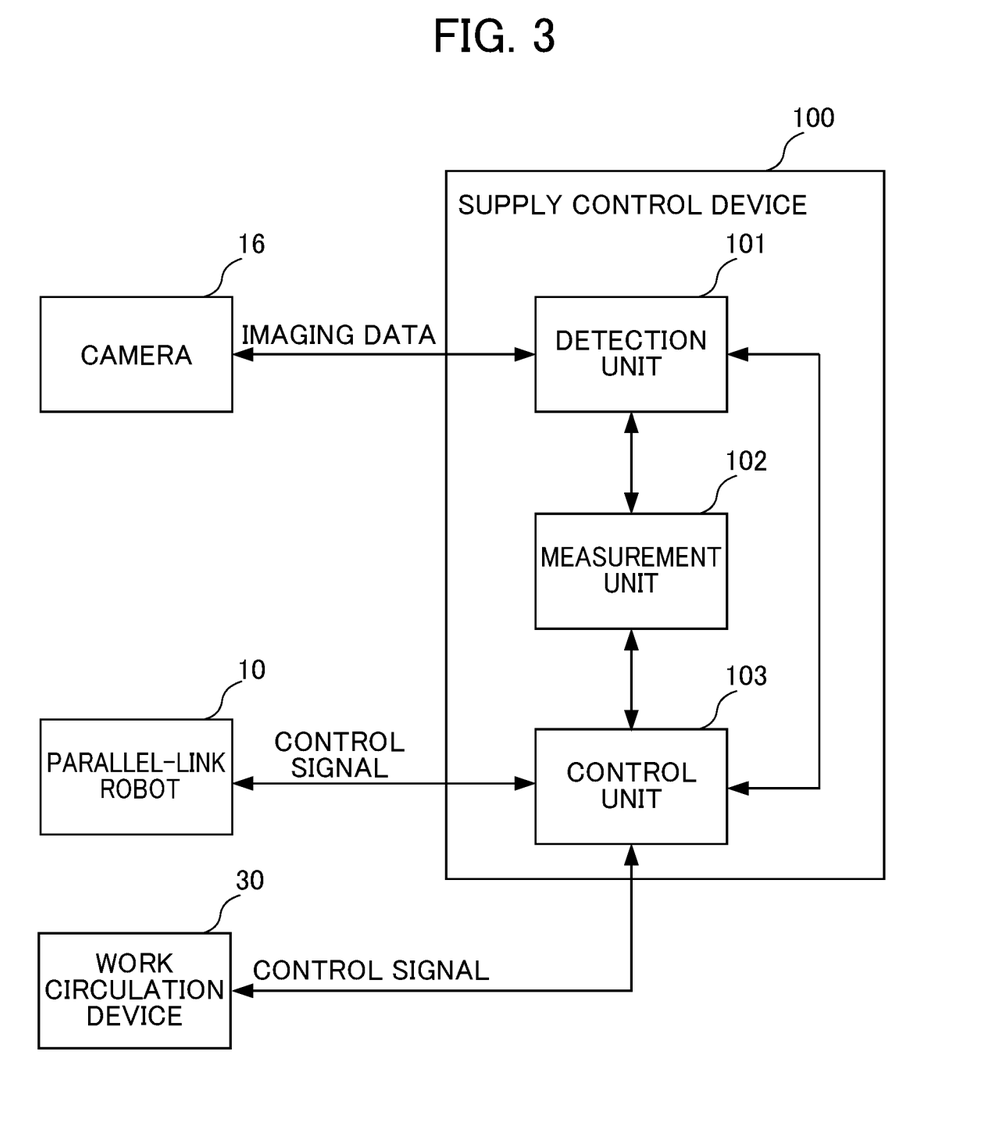
FIG. 3 is a block diagram showing functional blocks possessed by the supply control device of an embodiment of the present invention.

Next, an explanation will be made by referencing FIG. 3 for the functional blocks possessed by the supply control device 100. As shown in FIG. 3, the supply control device 100 includes a detection unit 101, measurement unit 102 and control unit 103. In addition, the supply control device 100 is communicably connected with the camera 16, parallel-link robot 10 and work supply device 20. This communication may be either of wire communication and wireless communication, or a combination thereof, and there are no particular limitations in the communication protocol, etc. thereof. In addition, this communication may be through a network such as LAN (Local Area Network) constructed in a factory or the like, and/or the Internet. In this case, although the supply control device 100 and each device may be installed in the neighborhood of each (for example, within the same factory), they may be installed independently at remote locations.

The detection unit 101 is a portion that image analyzes the imaging data of the work detection region 31 photographed by the camera 16. The detection unit 101 detects the position of works 40, posture of works 40, and/or type of works 40 in the work detection region 31 by way of this image analysis. The detection unit 101 outputs detection results to the measurement unit 102 and control unit 103. It should be noted that the technology for detecting the posture, etc. of the works 40 by way of image analyzing is technology that has been widely known to those skilled in the art, as described in Patent Document 1, for example; therefore, a detailed explanation will be omitted herein.

The measurement unit 102 accumulates detection results inputted from the detection unit 101. In addition, the measurement unit 102 acquires speed information indicating the current circulation speed of the work circulation device 30 from the control unit 103 described later. Then, the measurement unit 102 measures the total number of works 40 circulating on the work circulation device 30, and the density state of the works 40, based on the detection results of the detection unit 101 thus accumulated, and the speed information thereof.

Herein, measuring the density state of works 40 is the matter of, in the case of dividing the entire region on which the work circulation device 30 circulates into predetermined large regions, measuring whether being a state in which the works 40 positioned in a certain region are plentiful (i.e. the works 40 are in a dense state), or whether being a state in which the works 40 positioned in a certain region are few or no works 40 are present therein (i.e. whether the works 40 are in a sparse state). In the present embodiment, the measurement unit 102 assumes a configuration that measures the density state of the work retrieval region 32 as the certain region. In addition, it assumes a configuration that measures not only whether simply being sparse or dense, but also so far as how many of the works 40 are positioned in the work retrieval region 32.

Herein, the measurement method for the total number of works 40 and the measurement method for the density state of the measurement unit 102 will be explained based on a specific example. As a premise, the current circulation speed of the work circulation device 30 shall be a speed rotating once every 10 seconds. In addition, in the case of defining the central portion of the work detection region 31 as a position of 0 degrees, the central portion of the work retrieval region 32 shall exist at the position of 180 degrees. In this case, the measurement unit 102 measures the total number of works 40 detected from the imaging data of the work detection region 31 during the latest 10 seconds, as the total number of works 40 circulating on the work circulation device 30. In addition, the measurement unit 102 measures the density state of a region of the same size as the work retrieval region 32 in the middle of the work detection region 31 detected from the imaging data of the work detection region 31 5 seconds earlier as being the current density state of the work retrieval region 32.

In addition, since the circulation speed of the work circulation device 30 varies as mentioned above, the measurement unit 102 performs measurement in response to the variation. For example, in the case of the current circulation speed of the work circulation device 30 varying from a speed of rotating once every 10 seconds to a speed rotating once every 8 seconds, the measurement unit 102 measures the total number of works 40 detected from the imaging data of the work detection region 31 during the latest 8 seconds as the total number of works 40 circulating on the work circulation device 30. In addition, the measurement unit 102 measures the density state detected from the imaging data of the work detection region 31 in the latest 4 second as being the current density state in the work retrieval region 32. The measurement unit 102 outputs the measured total number of works 40, and/or the density state of the work retrieval region 32 to the control unit 103.

The control unit 103 is a portion that performs controls for the parallel-link robot 10 and work supply device 20. First, an explanation will be made for control of the parallel-link robot 10 by way of the control unit 103. The control unit 103 grasps the position of the works 40 in the work detection region 31, posture of the works 40, type of works 40, etc. based on the input from the detection unit 101. In addition, the control unit 103, due to adjusting the current circulation speed of the work circulation device 30, grasps the current circulation speed of the work circulation device 30. Then, based on this circulation speed, the posture of the work 40, etc., the control unit 103 generates a control signal for controlling the parallel-link robot 10, so that picking is performed appropriately by the parallel-link robot 10 in the work retrieval region 32. For example, as mentioned above, in a case of the current circulation speed of the work circulation device 30 being a speed rotating once every 10 seconds, and defining the central portion of the work detection region 31 as the position of 0 degrees, the central portion of the work retrieval region 32 shall exist at the position of 180 degrees.

In this case, a control signal for controlling movement of the parallel-link robot 10 after 5 seconds generated based on the input from the detection unit 101. Then, the control unit 103 outputs this control signal to the parallel-link robot 10. It is thereby possible for the parallel-link robot 10 to perform picking appropriately.

Next, an explanation will be made for control of the work circulation device 30 by way of the control unit 103. The control unit 103 grasps the total number of works 40, and/or the density state of the work retrieval region 32, based on the input from the measurement unit 102. Then, the circulation speed of the work circulation device 30 is controlled so as to be able to supply the works 40 at the optimal timing to the work retrieval region 32, based on this grasped information.

For example, so long as controlling based on the density state of the work retrieval region 32, in the case of there being few works 40 capable of being retrieved in the work retrieval region 32 (i.e. case of being sparse), it is configured so that the works 40 capable of being retrieved in the work retrieval region 32 are continuously supplied, by raising the circulation sped of the work circulation device 30. On the other hand, in the case of an abundance of the works 40 capable of being retrieved in the work retrieval region 32 being present (i.e. case of being dense), it is configured so that slipping by of works does not occur by lowering the circulation speed of the work circulation device 30.

In the present embodiment, it is possible to continuously supply the works 40 to the parallel-link robot 10 by way of the work circulation device 30 not only continuously circulating the works by way of circular motion, but also controlling the circulation speed based on the sparseness state, etc. in this way, and thus the parallel-link robot 10 can perform picking without interruption. Therefore, the parallel-link robot 10 comes to be able to exhibit stable throughput and high throughput.

It should be noted that, in the case of accelerating and decelerating the circulation speed of the work circulation device 30, is necessary for the parallel-link robot 10 to grasp the acceleration/deceleration in the circulation speed, and then perform picking at timing according to the circulation speed. However, if the control unit 103 separately controls the parallel-link robot 10 and the work circulation device 30, time lag will occur until the parallel-link robot 10 grasps the variation in the acceleration/deceleration in the circulation speed of the work circulation device 30, and the tracking accuracy of the parallel-link robot 10 will decline.

Therefore, in the present embodiment, the tracking accuracy of the parallel-link robot 10 is ensured by the control unit 103 performing control for both the parallel-link robot 10 and work circulation device 30. More specifically, control of the circulation speed is performed as control of an additional axis of the parallel-link robot 10. Then, the control information of this additional axis is outputted not only to the work circulation device 30, but also to the parallel-link robot 10. Since a time lag will thereby no longer occur until the parallel-link robot 10 grasps variation of the acceleration/deceleration in the circulation speed of the work circulation device 30, it becomes possible to ensure the tracking accuracy of the parallel-link robot 10. In addition, in the case of the parallel-link robot 10 having retrieved a work 40, the control unit 103 receives notification of this fact from the parallel-link robot 10. According to this notification, it is possible to correct the total number of works 40, and/or density state of the work retrieval region 32, measured by the measurement unit 102.

The functional blocks included in the supply control device 100 have been explained above in order to realize these functional blocks, the supply control device 100 includes an arithmetic processing device such as a CPU (Central Processing Unit). In addition, the supply control device 100 includes an auxiliary storage device such as a HDD (Hard Disk Drive) storing various control programs, and a main storage device such as RAM (Random Access Memory) for storing data which is temporarily necessitated upon the arithmetic processing unit executing programs.

Then, in the supply control device 100, the arithmetic processing unit reads application software and/or OS from the auxiliary storage device, and performs arithmetic processing based on this application and/or OS while expanding the read application software and/or OS in the main storage device. In addition, various hardware included by the respective devices is controlled based on computation results thereof. The functional blocks of the present embodiment are thereby realized. In other words, the present embodiment can be realized by hardware and software cooperating.

Next, an explanation will be made by referencing the flowchart of FIG. 4 for operations during stable supply control of works 40 in the present embodiment. In Step S11, the detection unit 101 detects the position, etc. of works 40, from the imaging data of the work detection region 31 photographed by the camera 16. In addition, the detection unit 101 outputs the detection data indicating the detection results to the measurement unit 102.

In Step S12, the measurement unit 102 accumulates detection data outputted by the detection unit 101, and measures the total number of works 40, and/or density state of the work retrieval region 32. Then, the measurement results are outputted to the control unit 103.

In Step S13, the control unit 103 determines whether a work 40 is not present in the work retrieval region 32 based on the measurement results of the measurement unit 102. In the case of a work 40 not being present in the work retrieval region 32, it is determined as YES in Step S13, and the processing advances to Step S14. Then, in Step S14, the circulation speed of the work circulation device 30 currently set is raised so that the works 40 capable of being retrieved in the work retrieval region 32 are supplied. Then, the processing returns to Step S11, and repeats the processing. On the other hand, in the case of a work 40 existing in the work retrieval region 32, it is determined as NO in Step S13, and the processing advances to Step S15.

In Step S15, the parallel-link robot 10 retrieves the work 40 from the work retrieval region 32, based on the control signal from the control unit 103. In this case, a notification is made of the event of retrieving the work 40 to the control unit 103 from the parallel-link robot 10 as mentioned above. The control unit 103 receives this notification and corrects the information of the density state of the work retrieval region 32.

In Step S16, the control unit 103 determines whether or not at least a predetermined number of the works 40 are present in the work retrieval region 32, based on the information of the density state after correction. Herein, predetermined number can be defined as any number according to the environment, etc. in which realizing the present embodiment.

In the case of at least a predetermined number of the works 40 being present in the work retrieval region 32, it is determined as YES in Step S16, and the processing advances to Step S17. Herein, the matter of at least a predetermined number of works 40 being present in the work retrieval region 32 irrespective of the work supply device 20 retrieving the work 40 in Step S15 is the matter of slipping by of a work 40 occurring. For this reason, the circulation speed of the work circulation device 30 current set is lowered so that slipping by does not occur in Step S17. Then, the processing returns to Step S11, and the processing is repeated.

On the other hand, in the case of at least a predetermined number of the works 40 not being present in the work retrieval region 32, it is determined as NO in Step S13, and the processing advances to Step S18. Herein, the matter of at least a predetermined number of the works 40 no longer being present in the work retrieval region 32 as a result of the work supply device 20 retrieving the work 40 in Step S15 is the matter of the work 40 being appropriately retrieved. For this reason, a fixed circulation speed that is currently set is maintained in Step 18. Then, the processing returns to Step S11, and the processing is repeated.

In the present embodiment, by controlling the circulation speed with the operations explained above, it is possible to supply the works 40 without interruption to the parallel-link robot 10, whereby it becomes possible for the parallel-link robot 10 to exhibit stable throughput, and high throughput.

It should be noted that each of the respective devices included in the above-mentioned embodiment can be realized by way of hardware, software, or a combination of these in addition, the supply control method performed by each device included in the above-mentioned embodiment can also be realized by hardware, software or a combination of these. Herein, being realized by software indicates the matter of being realized by a computer reading out and executing programs.

The programs can be stored using various types of non-transitory computer readable media, and supplied to a computer. The non-transitory computer readable media includes tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber, or a wireless communication path.

In addition, the aforementioned embodiment is a preferred embodiment of the present invention; however, it is not to limit the scope of the present invention to only the above-mentioned embodiment, and implementation in forms arrived at by conducting various modifications of a scope not departing from the gist of the present invention is possible.

MODIFIED EXAMPLE 1

Figure 4:
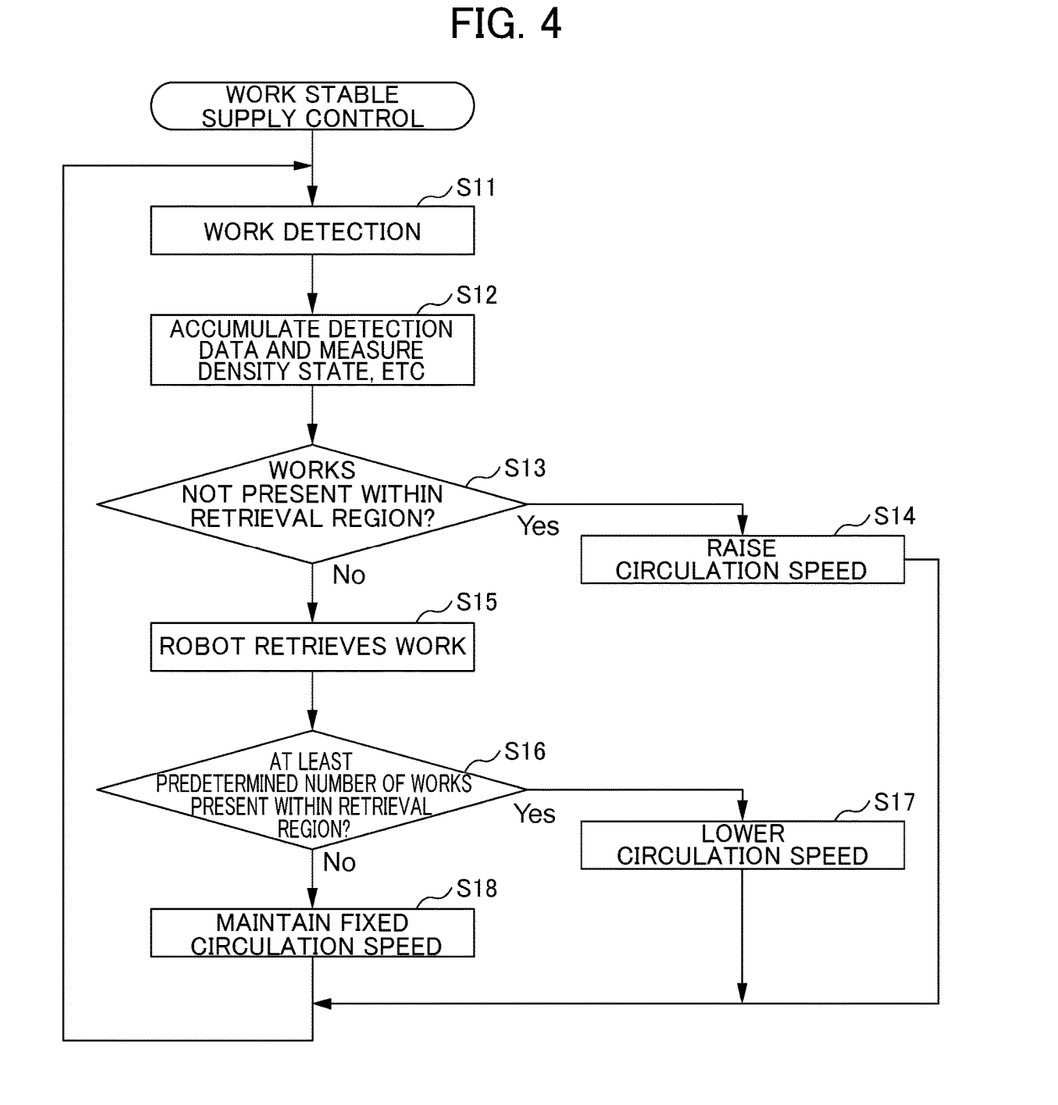
FIG. 4 is a flowchart showing basic operations in an embodiment of the present invention.

In the aforementioned embodiment, circulation speed is controlled based on the density state of the work retrieval region 32 (i.e. number of works 40 in the work retrieval region 32), so as to perform determination in Step S13 or Step S16 in FIG. 4. Modifying this, it may be configured so as to control the circulation speed according to the number of works 40 within a range from the work detection region 31 to the work retrieval region 32. For example, assuming the supplied number of works 40 that are supplied to the robot per unit time as being "number of works 40 within range from work detection region 31 to work retrieval region 32/circulation speed", the circulation speed may be controlled steplessly so that the supplied number of works 40 becomes constant.

MODIFIED EXAMPLE 2

In the aforementioned embodiment, the camera 16 is mounted to the parallel-link robot 10 as shown in FIG. 2. By modifying this, it may be configured so as to mount the camera 16 to another location capable of photographing the work detection region 31.

MODIFIED EXAMPLE 3

In the aforementioned embodiment, the work detection region 31 is photographed with the camera 16, and the position, etc. of works 40 in the work detection region 31 are detected by image analyzing the imaging data obtained by this photography. By modifying this, it may be configured so as to measure the work detection region 31 by a sensor other than the camera 16, and detect the position, etc. of the works 40 in the work detection region 31 by way of analyzing the measurement results thereof.

As the sensor other than the camera 16, it is possible to employ a photoelectronic sensor, for example. The photoelectronic sensor may be of transmission type or may be of reflection type. In the case of being transmission type, a projector and light receiver are installed to be separated relative to the work detection region 31. Then, by way of circulation, it is possible to detect the position, etc. of a work 40 from the light blocked between the projector and light receiver, when the work 40 enters the work detection region 31. In addition, in the case of being reflection type, a light emitter and light receiver are built into one sensor, and installed relative to the work detection region 31. Then, by way of circulation, it is possible to detect the position, etc. of a work 40 from the light receiver receiving the reflected light from the work 40, when the work 40 enters the work detection region 31.

MODIFIED EXAMPLE 4

In the aforementioned embodiment, although screws are assumed as the works 40, an article other than this may be established as the works 40. For example, an electronic component or the like having a connector for connecting with another article may be established as the work 40, and established as the target of picking.

MODIFIED EXAMPLE 5

In the aforementioned embodiment, it is assumed as realizing the supply control device 100 as a single device as shown in FIG. 3. By modifying this, it may be configured so as to realize the supply control device 100 by a plurality of devices. In addition, it may be configured so as to realize a part or the entirety of the functions of the supply control device 100 by the parallel-link robot 10 and/or work circulation device 30.

EXPLANATION OF REFERENCE NUMERALS 10 parallel-link robot
11 base
12 mobile part
13 drive link
14 passive link
15 gripper
16 camera
20 work supply device
21 work supply hole
30 work circulation device
31 work detection region.
32 work retrieval region
40 work
100 supply control device
101 detection unit
102 measurement unit
103 control unit

What is claimed is:

1. A supply control device for controlling a circulation device that causes an article to circulate in a system that includes the circulation device, and a robot that retrieves the article during circulation with the circulation device, the supply control device comprising:
    a detection unit that detects the article circulating with the circulation device, and a position of the article;
    a measurement unit that measures a number of the articles in a predetermined region on the circulation device, based on detection results of the detection unit;
    a control unit that controls a speed of circulation of the circulation device according to the number of the articles in the predetermined region measured by the measurement unit, and
    wherein the control unit corrects a number of articles in the predetermined region measured by the measurement unit, based on notification received from the robot that the robot retrieved an article in the predetermined region, and controls the speed of circulation of the circulation device according to the number of articles in the predetermined region after correction.

2. The supply control device according to claim 1, wherein the control unit controls so that the speed of circulation becomes faster with a fewer number of articles in the predetermined region measured by the measurement unit and a fewer number of articles in the predetermined region after the correction.

3. The supply control device according to claim 1, wherein the control unit
    raises the speed of circulation in a case of the article not being present in the predetermined region;
    lowers the speed of circulation in a case of at least a predetermined number of the articles being present in the predetermined region; and
    maintains the speed of circulation in a case of less than the predetermined number of the articles being present in the predetermined region.

4. The supply control device according to claim 1, wherein the predetermined region is a region in which the robot retrieves the article.

5. The supply control device according to claim 1,
wherein circulation of the circulation device is performed by causing the article to undergo circular motion, and
wherein the control unit controls a rotation speed of the circular motion as control of the speed of circulation.

6. The supply control device according to claim 1, wherein the control unit further performs control of an axis possessed by the robot, and outputs control information to both the circulation device and the robot.

7. A supply control method, for controlling a circulation device that causes an article to circulate in a system that includes the circulation device, and a robot that retrieves the article during circulation on the circulation device, the supply control method comprising the steps of:
  detecting the article circulating on the circulation device and a position of the article;
  measuring a number of the articles in a predetermined region of the circulation device, based on detection results of the step of detecting;
  controlling a speed of circulation of the circulation device according to the number of the articles in the predetermined region measured in the step of measuring, and
  wherein, in the step of controlling, a number of articles in the predetermined region measured by the measurement unit is corrected based on notification received from the robot that the robot retrieved an article in the predetermined region, and the speed of circulation of the circulation device is controlled according to the number of articles in the predetermined region after correction.

* * * * *